(12) United States Patent
Yokoyama et al.

(10) Patent No.: US 6,992,133 B2
(45) Date of Patent: Jan. 31, 2006

(54) LOW VOC, COATING COMPOSITIONS HAVING IMPROVED FLEXIBILITY AND IMPACT RESISTANCE BASED UPON NONLINEAR, LOW-MOLECULAR WEIGHT POLYESTER POLYOL RESINS

(75) Inventors: Thomas W. Yokoyama, Chicago, IL (US); Robert James McMillin, Oak Lawn, IL (US); Gary Wentworth, Chicago, IL (US)

(73) Assignee: CPH Innovations Corp., Chicago, IL (US)

( * ) Notice: Subject to any disclaimer, the term of this patent is extended or adjusted under 35 U.S.C. 154(b) by 234 days.

(21) Appl. No.: 10/375,522

(22) Filed: Feb. 27, 2003

(65) Prior Publication Data

US 2004/0171755 A1  Sep. 2, 2004

Related U.S. Application Data

(62) Division of application No. 09/778,685, filed on Feb. 7, 2001, now abandoned.

(60) Provisional application No. 60/180,999, filed on Aug. 2, 2000.

(51) Int. Cl.
*C08L 67/02* (2006.01)
*C08L 75/06* (2006.01)

(52) U.S. Cl. ............. 524/601; 525/131; 525/161; 525/162; 525/173; 525/176

(58) Field of Classification Search .......... 524/601; 525/131, 173, 176, 162
See application file for complete search history.

(56) References Cited

U.S. PATENT DOCUMENTS

| | | | |
|---|---|---|---|
| 4,284,750 A | 8/1981 | Amirsakis | 528/79 |
| 4,766,177 A | 8/1988 | Miller et al. | 525/131 |
| 4,888,441 A | 12/1989 | Calbo, Jr. et al. | 560/198 |
| 4,892,906 A | 1/1990 | Pham et al. | 524/730 |
| 4,902,821 A | 2/1990 | Calbo, Jr. et al. | 560/193 |
| 4,922,002 A | 5/1990 | Calbo, Jr. et al. | 560/193 |
| 4,933,214 A * | 6/1990 | Sugiura et al. | 427/379 |
| 4,960,828 A | 10/1990 | Higuchi | 525/162 |
| 5,023,367 A | 6/1991 | Calbo, Jr. et al. | 560/193 |
| 5,214,086 A | 5/1993 | Mormile et al. | 524/237 |
| 5,506,328 A | 4/1996 | Chandalia et al. | 528/49 |
| 5,663,233 A * | 9/1997 | Bederke et al. | 525/173 |
| 5,977,256 A * | 11/1999 | Huybrechts et al. | 525/131 |
| 5,981,652 A * | 11/1999 | Kawazu et al. | 524/784 |
| 6,063,448 A * | 5/2000 | Duecoffre et al. | 427/407.1 |
| 6,087,469 A * | 7/2000 | Epple et al. | 528/307 |

FOREIGN PATENT DOCUMENTS

EP  0940415 A2  9/1999
EP  955326 A1  11/1999

OTHER PUBLICATIONS van Leeuwen. B., "High Hydroxy Acrylics with Tightly Controlled Molecular Weight," *Polym. Paint Colour J.*, 11-13 (1997).

International Search Report, PCT/US01/03928, European Searching Authority.

* cited by examiner

*Primary Examiner*—Jeffrey B. Robertson
(74) *Attorney, Agent, or Firm*—Marshall Gerstein & Borun LLP

(57) ABSTRACT

Coating compositions based on nonlinear, low molecular weight, polyester-based polyols having low viscosity and high solids content made by reacting a branched, polyhydric alcohol having at least three hydroxyl groups, such as trimethylolpropane; a glycol or diol; and a compound selected from the group consisting of a aliphatic or aromatic dicarboxylic acid, $C_1$–$C_6$ alkyl ester, anhydride, diacid halide, or mixtures thereof. The nonlinear, polyester-based polyols are quite effective in maintaining a high solids content while lowering viscosity when blended with other coating resins, such as acrylic resins, making the coating resins more effective in cured coatings by improving flexibility, impact resistance and hardness without adversely affecting appearance, solvent resistance, and/or accelerated weathering. This invention also relates to the process of coating a substrate with these coating compositions.

44 Claims, No Drawings

LOW VOC, COATING COMPOSITIONS HAVING IMPROVED FLEXIBILITY AND IMPACT RESISTANCE BASED UPON NONLINEAR, LOW-MOLECULAR WEIGHT POLYESTER POLYOL RESINS

This application is a divisional application of Ser. No. 09/778,685, filed Feb. 7, 2001, now abandoned, which claims priority to provisional application 60/180,999, filed Aug. 2, 2000.

FIELD OF THE INVENTION

The present invention is directed to nonlinear polyester-based polyols, nonlinear polyester-based resin compositions, methods of producing nonlinear polyester-based polyols and nonlinear, polyester-based resin compositions, and methods of manufacturing and using cured polymeric articles and coatings therefrom. These nonlinear, polyester-based polyol compositions are especially useful when blended with acrylic resins, particularly acrylic polyols, and a hydroxyl cross-linking agent, particularly isocyanates to be used in coatings, particularly automotive, aerospace, and industrial coatings. These nonlinear, polyester-based coating compositions maintain a comparatively high solids content while lowering the crystallinity and viscosity of the resulting composition. The ability to maintain a high solids content while lowering the viscosity of a coating composition eliminates the need for reactive diluents which leads to lower isocyanate demand, lower volatile organic compound (VOC) content, quicker drying times, and elimination of the poor incorporation problems often associated with reactive diluents. These improved properties provide for a more effective coating composition compared to currently marketed low viscosity, high solids content coating compositions. The improved composition performance means the resulting coatings have improved flexibility and impact resistance/hardness with improved, or without adversely affecting, appearance, solvent resistance, and/or accelerated weathering.

BACKGROUND OF THE INVENTION AND PRIOR ART

Automotive and aerospace coatings must be of sufficient hardness and flexibility to be able to endure a wide variety of harsh environments including, for example, exposure to impact and corrosive materials. Further, a single coating composition has not been found that is capable of coating both metal and flexible polymeric substrates while maintaining long lasting adherence to both materials, particularly where, as is the case of a polymeric automotive bumper, the polymeric substrate may be flexed in use. Automotive and aerospace coatings are also expected to enhance and control the visible appearance of the substrate, especially with regard to color and gloss. At the same time, due at least in part to the introduction of the Clean Air Act of 1970, coatings formulators are also under pressure to reduce VOC, which translates to the solvent demand of the coating composition, to as low a level as technological advances will allow. One-component and two-component, isocyanate-based coating formulations are well-known and are widely used in the industry. Acrylic functional polyols, particulary the JONCRYL® or SCX™ acrylic polyols from S. C. Johnson, the Paraloid® acrylic polyols from Rohm and Haas, and the Reactol™ acrylic polyols from Eastman have long been the standard building block for two component automotive, aerospace, and industrial coatings where hardness and exterior durability are critical measures of utility (CMUs). Nonetheless, they still suffer from a high solvent demand in order to achieve a suitable application viscosity and there are limitations with formulating these resins into coatings, especially when low application viscosities are required. Reactive diluents are often used in combination with these resins to further lower the VOC of these coatings.

While reactive diluents may allow for the coating to be formulated at a desired VOC, they also have disadvantages in their use. Most reactive diluents are only di-functional and have low molecular weights, which often leads to a higher isocyanate demand and increased brittleness in the resulting coating. Addition of reactive diluents also tends to slow dry times and the diluent may fail to incorporate. Various acrylic polymers have been combined with polyester polymers as suggested in U.S. Pat. No. 4,766,177. U.S. Pat. Nos. 4,888,441; 4,902,821; 4,922,002; 5,023,367; (all of which patents are incorporated herein by reference) disclose linear, low molecular weight, polyester-based polyols which can been used with resins in the manufacture of coatings and have been reported to overcome some of the above-mentioned problems. Linear, low molecular weight, polyester-based polyols can provide relatively lower viscosity and maintain comparatively high solids content in comparison with most available acrylic resins. The linear polyols described in the prior art have an additional disadvantage in that they are only di-functional. This limits their ability to crosslink, which inevitably can compromise both the appearance and durability of the resulting coating under accelerated weathering (QUV) conditions. It would be highly desirable to provide new coating compositions, which are inherently low in viscosity and allow for minimal or no solvent addition (lower VOC) when applied to the surface of a substrate, but which are compatible with a variety of materials and exhibit the excellent attributes and properties associated with two component coatings, such as superior compatibility and applicability, a high (pendulum, pencil) hardness and better direct impact resistance, flexibility, appearance and gloss retention, and the like. The compositions of the present invention provide such properties and attributes.

SUMMARY OF THE INVENTION

The foregoing described desirable attributes of a coating composition are provided by the resins and coating compositions of the present invention that are characterized by excellent flexibility, impact resistance and hardness without adversely affecting appearance, solvent resistance, and/or accelerated weathering. The present invention relates to a novel composition based on: a) a nonlinear, low molecular weight, polyester polyol resin, combined with b) an acrylic polyol resin.

More particularly, the present invention comprises an ambient curable coating composition based on: a) a nonlinear, low molecular weight, polyester polyol resin, that is a reaction product of (i) an aliphatic or aromatic dicarboxylic acid, $C_1$–$C_6$ alkyl ester, anhydride, and/or an diacid halide, with (ii) a branched, polyhydric alcohol having at least three hydroxyl groups, preferably primary, and (iii) a glycol or diol. In the preferred embodiment, the resulting resin is combined with b) at least one acrylic polyol resin; c) at least one curing agent; and d) at least one liquid carrier.

In the preferred embodiment of the invention, the coating composition includes: a) a nonlinear, low molecular weight, polyester polyol resin, that is a stepwise reaction product of (i) an aliphatic or aromatic dicarboxylic acid, $C_1$–$C_6$ alkyl ester, anhydride, and/or an diacid halide, with (ii) a branched, polyhydric alcohol having at least three hydroxyl groups, preferably primary, and subsequently (iii) a glycol or diol. In the preferred embodiment, the resulting resin is combined with b) at least one acrylic polyol resin, c) at least one isocyanate resin curing agent, and d) at least one organic liquid carrier.

The coating may be cured at room or ambient temperatures but may also be baked to cure at a temperature sufficient for curing all resins in the composition, e.g. from about 50° C. to about 200° C.

This invention is also directed to a method of reducing the volatile organic content (VOC) of a coating composition by increasing the solids in a coating composition without adversely affecting the sprayable viscosity of the coating and also without significantly decreasing the durability, hardness, flexibility, or other performance aspects of the composition, and to a coating composition so produced.

This invention also relates to a method to increase the solids and/or reduce the volatile organic component of a coating in an already existing commercial coating composition and to the coating produced.

Another aspect of the present invention relates to a process for coating a substrate comprising contacting the substrate with the above-described coating composition to provide a continuous coating on the substrate.

The above and other aspects and advantages of the present invention will become apparent upon reading the following detailed description of the preferred embodiments of the present invention.

DETAILED DESCRIPTION OF THE PREFERRED EMBODIMENTS

This invention relates to nonlinear, low molecular weight, polyester-based polyols having comparatively low viscosity and a comparatively high solids content. The invention also relates to a process for the preparation of said polyols. The polyols of the present invention can be prepared by esterifying and/or transesterifying the $C_1$–$C_6$ alkyl esters of aliphatic or aromatic dicarboxylic acids, aliphatic or aromatic anhydrides, and/or aliphatic or aromatic diacid halides thereof, or mixtures thereof. It is preferred to start with a mixture of the methyl esters of adipic and glutaric acid, although other $C_1$–$C_6$ alkyl esters can be used, such as the ethyl, propyl and butyl esters, and the like. Furthermore, this mixture of methyl esters of adipic and glutaric acid is available commercially and is therefore additionally preferred, for this reason. These methyl esters, as available commercially, have a mole equivalent ratio of about 3:1, dimethyl glutarate to dimethyl adipate, respectively. Variation of this molar equivalent ratio can be tolerated depending upon the desired properties of the final product. Lower viscosities are obtainable with higher levels of glutarate, for example. Nor is it necessarily limited to a mixture of the two esters. The resins of the present invention also can be prepared by starting with a mixture of more than two dibasic esters or a single dibasic ester, acid(s), anhydride(s), and/or diacid halide(s) to make the nonlinear, polyester-based polyols of the present invention. Other dibasic esters, acids and anhydrides that are useful, singly, or in a mixture of any two or more, include, for example, dimethyl 1,12-dodecanedioate, dimethyl tartrate, dimethyl sebacate, dimethyl azelate, dimethyl suberate, dimethyl pimelate, and dimethyl succinate, pthalic anhydride, and isophthalic acid.

In accordance with an important feature of the present invention, the above-described methyl esters, sometimes referred to as dibasic esters (DBE from DuPont, DME from Solutia) for brevity, are mixed with one or more branched, polyhydric alcohol(s), containing at least three hydroxyl groups, preferably primary; and at least one glycol or diol, preferably as 1,4-cyclohexane dimethanol (CHDM), to reduce viscosity while maintaining the improved properties in the resulting blended resins, coatings, and resin-coated substrates. The preferred branched, polyhydric alcohol is trimethylolpropane, (TMP). Examples of other branched polyhydric alcohols that could be used, instead of or in addition to TMP, include trimethylolethane, pentaerythritol, glycerine, and dipentaerythritol. Examples of other glycol or diol(s) that can be used include 1,4-butanediol (BD), diethylene glycol (DEG), 2-methyl-1,3-propanediol (Mp diol). 2,2-dimethyl-1,3-propanediol (NPG), 2-butyl-2-ethyl-1,3-propanediol (BEPD), 2,2,4-trimethyl-1,3-pentanediol (TMPD), 1,6-hexanediol, 1,2,6-hexanetriol, 1,2-propanediol, 1,3-propanediol, 1,2-hexanediol, 1,3-butanediol, 1,5-pentanediol, and mixtures thereof.

Usually, a catalyst is employed for the esterification/transesterification reaction for the purpose of lowering reaction temperature and reducing color development in the cured resin. Typical catalysts that may be employed are the alkoxides of titanium, soluble tin compounds such as dibutyl tin diacetate or dilaurate, soluble zinc compounds such as $Zn(OAc)_2$, and soluble manganese compounds such as $Mn(OAc)_2$. Catalyst levels of, for example, 0.0001 to 5.0% by weight can be used with typical levels of 0.01 to 0.1% by weight.

In the preferred embodiment, the mixed methyl esters are combined with at least one glycol or diol and TMP in a suitable reaction vessel and heated in the presence of a conventional transesterification catalyst, such as dibutyl tin diacetate, in order to accomplish transesterification. Although not essential, methanol is split off during the heating step and is easily removed as free methanol until the new reaction product is devoid of, or substantially completely free of, methanol, preferably less than 0.5% by weight. The reaction mixture is then cooled and the additional glycol or diol(s), such as CHDM, is added to the reaction vessel and heated in the presence of a conventional transesterification catalyst, such as dibutyl tin diacetate, in order to accomplish transesterification. The resultant product will contain, as a general rule, some varying amounts of unreacted diols depending on the initial mole ratio of the reactants. The initial starting mole ratios of the total number of moles of the dimethyl esters, also referred to as dibasic esters, to the number of moles of branched, polyhydric alcohol(s) containing at least three hydroxyl groups, preferably primary, such as TMP, and the additional glycol or diol(s), such as CHDM, respectively, can be varied between about 2:1:2 and 150:1:205 respectively, but is preferably 3–8:1:6–120.

There is usually a distribution of hydroxyl values of these nonlinear, polyester-based polyols. Preferably the hydroxyl value of the nonlinear, polyester-based polyols is above 35 and more preferably between about 35 and about 350, and the average functionality is greater than 2, more preferably less than 6, and more preferably between about 2.1 to about 2.5.

There is usually a distribution of molecular weights of these nonlinear, polyester-based polyols which can be described by a number of different terminologies. The two main terminologies are number average molecular weight (Mn) and weight average molecular weight (Mw). Mn is a measurement of colligative properties and defined as the total weight of the molecules in the sample divided by the total number of moles present:

$$Mn = \frac{w}{\sum N_x} = \frac{\sum N_x M_x}{\sum N_x}$$

wherein Σ=summation of x=1 to x=infinity, w=weight of the sample, $N_x$=number of moles of x whose molecular weight is $M_x$. Gel Permeation Chromatography (GPC) is typically used to determine the values of $N_x$ and $M_x$. Mw is typically determined from light scattering where the higher molecular weights become more heavily weighted:

$$Mw = \frac{\sum N_x M_x^2}{\sum N_x M_x}$$

wherein Σ=summation of x=1 to x=infinity, w=weight of the sample, $N_x$ =number of moles of x whose molecular weight is $M_x$ (Principles of Polymerization, 2nd Edition, George Odian, John Wiley and Sons Inc., 1981 pages 20–25). In reactive systems such as the present invention, the number average molecular weight is usually the more important term. Preferably the number average molecular weight of the nonlinear, polyester-based polyols is above 500 and more preferably between about 500 and 1500.

The present invention also relates to coating compositions which include a combination of the above-described nonlinear, polyester-based polyols, unmodified or together with at least one additional resin, particularly an additional polyol-containing resin or hydroxy functional polymer, and a curing agent. The preferred additional polyol-containing resin or hydroxy functional polymer is an acrylic polyol resin composition, such as those prepared by free radical polymerization techniques by the addition of one or more monomers where at least one monomer contains a reactive hydroxyl group. Representative hydroxy-functional monomers include 2-hydroxyethyl acrylate, 2-hydroxyethyl methacrylate, 2-hydroxypropyl acrylate, 2-hydroxypropyl methacrylate, 4-hydroxybutyl methacrylate, tetraethylene glycol acrylate, para-vinylbenzyl alcohol and other similar monomers. These monomers would be copolymerized with one or more of the following monomers: methyl acrylate, ethyl acrylate, butyl acrylate, isobutyl acrylate, ethylhexyl acrylate, methyl methacrylate, ethyl methacrylate, propyl methacrylate, isobornyl methacrylate, acrylic acid, methacrylic acid, vinyl acetate, vinyl propionate, vinyl butyrate, vinyl isobutyrate, vinyl benzoate, styrene and styrene based monomers such as alpha-methyl styrene, allyl compounds, and other copolymerizable unsaturated monomers such as acrylonitrile, maleates, fumarates, dienes such as 1,3 butadiene. The preferred additional polyol-containing resin or hydroxy functional polymer is an acrylic polyol, such as S. C. Johnson's SCX™-902, Rohm and Haas' Paraloid®AU-608B, or Eastman's Reactol™ 100 for combination with the above-described polyester-based polyols. The polyester polyol is included in the composition in an amount of about 5% to about 95%, preferably about 10% to about 70%, and more preferably about 20% to about 40%.

Examples of cross-linking or curing agents include amino resins, such as conventional melamine resins, alkylated melamine resins, partially alkylated and high amine melamine resins, benzo-guanamine resins, glycoluril resins, epoxy resins such as aliphatic and aromatic epoxies such as those made by the reaction of a polyol and an epihalohydrin, cycloaliphatic epoxy resins, epoxidized oils, epoxy functional copolymers such as those derived from ethylically unsaturated monomers such as glycidyl acrylate or glycidyl methacrylate. The cross-linking or curing agent is typically an aliphatic, aromatic or cycloaliphatic di-isocyanate, triisocyanate, triisocyanurate, polyisocyanate, isocyanurate, allophaniate, uretdione, biuret, and/or isocyanate prepolymer, and preferably used in an amount substantially equivalent to the molar equivalent quantity of all polyol resins in the composition. The preferred curing agent is a aliphatic polyisocyanate, such as Bayer's Desmodur N-3300. In addition to, or instead of, the isocyanates, one or more other curing agents can be used.

The coating composition employed in the process of the present invention contains small quantities of one or more isocyanate-inert solvents in amounts of between 0% and 45% by weight, preferably about 25% to about 35% by weight, based upon the total weight of the coating composition, in order to lower the viscosity of the composition sufficiently for spray application to the surface of a substrate to be coated. It is preferred to minimize the amount of solvent utilized in coating compositions of the present invention in order to minimize the VOC of the coating composition. The composition of the present invention, typically includes 8–13% by weight less organic solvent than previous resin blends. However, some amount of solvent may be required in order to provide a desired low viscosity for the coating composition of less that about 30 seconds as measured by Zahn efflux cup #2 (ASTM D-4312). Suitable solvents include, ketones, such as, acetone, methyl ethyl ketone, methyl isobutyl ketone, methyl butyl ketone, methyl amyl ketone; esters, such as, methyl acetate, ethyl acetate, propyl acetate, butyl acetate, t-butyl acetate, isobutyl acetate, ethylethoxy propionate, ethylethoxy acetate, ethylene glycol monomethyl ether acetate, ethylene glycol monoethyl ether acetate; and aromatics, such as xylene, toluene, aromatic naphtha, aromatic 100, aromatic 150, aromatic 200, parachlorobenzotrifluoride (PCBTF) (Oxsol 100), an aromatic hydrocarbon mixture having a boiling point of 152° C.–174° C.; mineral spirits; combinations thereof, and the like.

Other optional additives are suitably employed, if desired, such as, for example, UV stabilizers; leveling agents; flow-aids; pigments, such as titanium dioxide; plasticizers; and/or other resins. The coating compositions made in accordance with the process of the present invention are suitable for use in the production of clear or pigmented coatings, and may be applied to a desired substrate by conventional methods, such as brush coating, roller or spraying application. Because of the low viscosity of the compositions of the present invention, they are especially suitable for application by commonly used spray techniques, such as high volume low pressure (HVLP) or conventional spray application.

Substrates for the coating useful in the present invention are suitably selected from a wide range of materials Such as plastics, e.g., polyethylene or polystyrene, wood and paper substrates, and metal substrates, such as sheet steel or aluminum.

The coatings of the present invention are suitable for use in the production of automotive and aerospace paints including clear coatings or undercoats, floor covering coatings, wall coatings, transportation coatings, maintenance coatings, and the like, or any other application where a low VOC coating composition is desired for use on a substrate.

This present invention also is directed to a method of reducing the VOC of a coating composition by increasing the solids content of the composition without adversely affecting the durability or performance of the composition.

Although one of the principal uses of the polyol resin-based compositions of the present invention is in coating compositions, these polyol compositions are also useful in adhesives, foams, moldings, elastomers, and laminates with whatever modifications may be required, such as further additions, e.g., fillers, multiple layers, and the like.

The following examples are intended to further illustrate, but in no way limit the scope of, the present invention. Examples 1–6 illustrate the synthesis of various polyol compositions which are used in the coating compositions of Examples 7–14. Example #7 demonstrates that the addition of polyol from Example #1 to an acrylic polyol by weight results in a urethane coatings composition with lower VOC, improved direct impact resistance, and improved indirect impact resistance. At the same time it did not adversely affect pendulum hardness, pencil hardness, appearance as measured by gloss, or accelerated weathering as measured by QUV gloss retention at 2079 hours. Example #8 demonstrates the advantage of a CHDM containing polyester polyol (Example #1) compared to a conventional polyester polyol (Example #2) in an acrylic urethane coatings formulation. The coatings formulation containing the conventional polyester polyol had significantly lower pendulum hardness and pencil hardness compared to the coatings formulation containing the CHDM polyester polyols. Example #9 demonstrates the advantages of polyester polyol from Example #1 to a commercially available polyester polyol and an adipate-based polyester polyol in an acrylic urethane coatings formulation. The coatings formulation containing the commercially available polyol had slightly lower pendulum hardness and lower pencil hardness compared to the polyester polyol from Example #1. The adipate-based polyester polyol was a hazy solution, poorer appearance measured by gloss and slightly lower pencil hardness. Example #10 demonstrates the advantages of using a monomer with functionality of three or greater to achieve branching in the synthesis of a polyester polyol (Example #1) compared to a linear polyester polyol (Example #3) in an acrylic urethane coatings formulation. The coatings formulation containing the linear polyester polyol had slightly lower pendulum hardness and pencil hardness compared to the formulation containing the branched polyester polyol. Example #11 demonstrates the superior compatibility of polyester glutarates compared to polyester adipates in blends with acrylic resins. Within seven days the polyester adipate mixture with an acrylic polyol was cloudy and had crystalline precipitate. The polyester glutarate mixture with the same acrylic polyol was a clear liquid. Example #12 demonstrates that a primarily CHDM glutarate polyester polyol can be blended with acrylic polyols from two other suppliers and still provide significant advantages. In either case, the polyester polyol containing formulation had lower VOC, better impact resistance without sacrificing hardness or appearance. Example #13 demonstrates that a coatings formulation with a polyester polyol with a lower hydroxyl value could demonstrate some advantages over an all acrylic polyol formulation. The formulation containing the polyester polyol had lower VOC, higher pendulum hardness, better direct impact resistance, better indirect impact resistance compared to the all acrylic polyol formulation. In addition, there was no loss of appearance or pencil hardness.

EXAMPLE #1

Polyol Example #1

A suitable glass reactor was equipped with a thermocouple-operated heating mantle, motorized agitator nitrogen purge of 2 scfm, and a thermometer. The reactor was also equipped with a glass-packed column leading to a water-cooled condenser and receiving flask for the recovery of by-products.

Trimethylolpropane (TMP) and Solutia's dimethyl ester-2 (DME-2) were charged to the reactor in the following molar amounts; TMP, 1.56 moles, and DME-2, 8.25 moles. The raw materials were heated to 270° F., and 0.00625% of total batch weight of dibutyltin diacetate was added. The reactor was then heated to a maximum temperature of 420° F., while the methanol by-product was collected in the recovery flask. Temperature was maintained at 420° F. for one hour.

The batch was then cooled to 250° F. at which time 18.38 moles of CHDM were added to the reaction flask along with 0.00625% of total batch weight of dibutyltin diacetate. This mixture was heated to 420° F. and held for one hour, at which time the glass-packed column was removed. Temperature was held for one hour at 420° F., then partial vacuum of 150 mm Hg was applied for 15 minutes. The amount of recovered by-product, methanol, was found to be 12.57% of the total batch weight. The product was put under a vacuum of 150 mm Hg until the finished product tested to a hydroxyl value of 280,±10. The clear, colorless product had a viscosity of 17,120 cps. @25° C.

EXAMPLE #2

Polyol Example #2

A suitable glass reactor was equipped as in Example 1. TMP and DME-2 were charged to the reactor in the following molar amounts; TMP, 1.56 moles, and DME-2, 12.88 moles. The raw materials were heated to 270° F., and 0.00625% of total batch weight of dibutyltin diacetate was added. The reactor was then heated to a maximum temperature of 420° F., while the methanol by-product was collected in the recovery flask. Temperature was maintained at 420° F. for one hour.

The batch was then cooled to 250° F. at which time 21.0 moles of 2-methyl-1,3-propanediol (Mpdiol) were added to the reaction flask along with 0.00625% of total batch weight of dibutyltin diacetate. This mixture was heated to 420° F. and held for one hour, at which time the glass-packed column was removed. Temperature was held for one hour at 420° F., then partial vacuum of 150 mm Hg was applied for 15 minutes. The amount of recovered by-product, methanol, was found to be 19.03% of the total batch weight. The product was put under a vacuum of 150 mm Hg until the finished product tested to a hydroxyl value of 280, ±10. The clear, colorless product had a viscosity of 1,235 cps. @ 25° C.

EXAMPLE #3

Polyol Example #3

A suitable glass reactor was equipped as in Example 1. TMP and adipic acid were charged to the reactor in the following molar amounts; TMP, 1.70 moles, and adipic acid, 10.08 moles. The raw materials were heated to a maximum temperature of 420° F., while the water by-product was collected in the recovery flask. Temperature was maintained at 420° F. for one hour.

The batch was then cooled to 250° F. at which time 20.13 moles of CHDM were added to the reaction flask. This mixture was heated to 420° F. and held for one hour, at which time the glass-packed column was removed. Temperature was held for one hour at 420° F., and then partial vacuum of 150 mm Hg was applied for 15 minutes. The amount of recovered by-product, water, was found to be 8.64% of the total batch weight. The product was put under a vacuum of 150 mm Hg until the finished product tested to a hydroxyl value of 280, ±10. The product was a waxy, white semi-solid at 25° C.

EXAMPLE #4

Polyol Example #4

A suitable glass reactor was equipped as in Example 1. CHDM and DME-2 were charged at the following moles; CHDM, 18.38 moles, and DME-2, 8.25 moles. The raw materials were heated to 270° F., and 0.0125% of total batch weight of dibutyltin diacetate was added. The reactor was then heated to a maximum temperature of 420° F., while the methanol by-product was collected in the recovery flask. Temperature was maintained at 420° F. for one hour, at which time the glass-packed column was removed. Temperature was held for one hour at atmospheric pressure, then partial vacuum of 150 Mm Hg was applied for 15 minutes. The amount of recovered by-product, methanol, was found to be 12.57% of the total batch weight. The product was put under vacuum until the finished product tested to a hydroxyl value of 280, ±10. The clear, colorless product had a viscosity of 10,500 cps. @ 25° C.

EXAMPLE #5

Polyol Example #5

A suitable glass reactor was equipped as in Example 1. TMP and DME-2 were charged at the following moles: TMP, 1.67 moles; and DME-2, 8.21 moles. The raw materials were heated to 270° F., and 0.00625% of total batch weight of dibutyltin diacetate was added. The reactor was then heated to a maximum temperature of 420° F. while the methanol-by-product was collected in the recovery flask. Temperature was maintained at 420° F. for one hour The batch was then cooled to 250° F. at which time 15.77 moles of CHDM and 5.18 moles of Mpdiol were added tp the reaction flask along with 0.00625% of total batch weight of dibutyl tin diacetate. This mixture was heated to 420° F. and held for one hour at which time the glass-packed column was removed, temperature was held for one hour then partial vacuum of 150 Mm Hg was applied for 15 minutes. The amount of recovered by-product, methanol, was found to be 12.51% of the total batch weight. The product was put under vacuum until the finished product tested to a hydroxyl value of 280±10. The clear, colorless product had a viscosity of 13,400 cps at 25° C.

EXAMPLE #6

Polyol Example #6

A suitable glass reactor was equipped as in Example 1. CHDM, TMP, and DME-2 were charged at the following moles: CHDM, 16.45 moles, TMP, 0.08 moles, and DME-2, 11.18 moles. The raw materials were heated to 270° F., and 0.0125% of total batch weight of dibutyltin diacetate was added. The reactor was then heated to a maximum temperature of 420° F. while the methanol by-product was collected in the recovery flask. Temperature was maintained at 420° F. for one hour at which time the glass-packed column was removed. Temperature was held for one hour at atmospheric pressure, then partial vacuum of 150 Mm Hg was applied for 15 minutes. The amount of recovered by-product, methanol, was found to be 17.03% of the total batch weight. The product was put under vacuum until the finished product tested to a hydroxyl value of 110,±5. The clear, colorless product had a viscosity of 80,000 cps.@ 25° C.

EXAMPLE #7

Coatings Example #1

Coating compositions were prepared by mixing the following ingredients:

| Formulation | #1 | #2 |
|---|---|---|
| Polyol from Example #1 | 10.8 | 0.0 |
| Acrylic polyol (1) | 33.7 | 50.3 |
| Polymeric Isocyanate (2) | 22.3 | 16.2 |
| Solvent Blend (3) | 32.8 | 33.1 |
| Tin Catalyst (4) | 0.1 | 0.1 |
| Flow Control Agent (5) | 0.3 | 0.3 |

(1) SCX-902 ™ as supplied from S. C. Johnson Polymer
(2) Desmodur N3300 as supplied from Bayer Corporation
(3) Solvent blend 50 parts n-butyl acetate, 25 parts methyl n-amyl ketone, 25 parts methyl ethyl ketone.
(4) Dabco T-12 Catalyst from Air Products diluted to 2% by weight in n-butyl acetate
(5) BYK 310 as supplied from BYK-Chemie Properties of Formulations:

| Property | #1 | #2 |
|---|---|---|
| VOC Theoretical (6) | 3.6 | 4.0 |
| Ratio Polyester/Acrylic Dry weight | 30/70 | 0/100 |
| Isocyanate/Hydroxyl Molar Equivalent Ratio | 1.1/1.0 | 1.1/1.0 |

(6) Volatile Organic Compounds in pounds of organic material/gallon of paint.

Measured Properties

| Property | #1 | #2 |
|---|---|---|
| VOC Measured (Pounds/Gallon) (7) | 3.2 | 3.5 |
| Viscosity (8) | 27 | 29 |

(7) Volatile Organic Compounds measured by ASTM D2369 pounds/gallon
(8) Viscosity via Zahn #2 efflux cup ASTM D-4312 measured in seconds.

Coatings were spray applied using convention spray guns over iron phosphate coated steel panels (9) and aluminum (10) to a dry film thickness of 1.5–3.0 mils. Coatings were flashed at ambient conditions for 30 minutes and baked at 105° C. for 30 minutes. Properties are listed below.

| Property | #1 | #2 |
| --- | --- | --- |
| Pendulum Hardness (11), 24 Hours | 49 | 53 |
| Pendulum Hardness, 1 Week | 103 | 119 |
| Pencil Hardness (12), 24 Hours | HB | HB |
| Pencil Hardness, 2 Weeks | 2H | 2H |
| Direct Impact Resistance(13), 4 Weeks | >160 | 120 |
| Indirect Impact Resistance (14) 4 weeks | >160 | 80 |
| Gloss, 20 Degree (15), 1 Week | 90 | 89 |
| Gloss, 60 Degree (16), 1 Week | 94 | 93 |
| Dry Film Thickness (17), 24 Hours | 2.5 | 2.8 |
| QUV Resistance (18): 20 Degree Gloss Retention at 2079 Total Hours | 91% | 84% |

(9) Bonderite 1000 panels supplied by ACT Laboratories
(10) Aluminum, untreated panels supplied by ACT Laboratories
(11) Pendulum Hardness, number of swings, ASTM D-4366.
(12) Pencil Hardness, grade of pencil lead, ASTM D3363.
(13) Direct Impact Resistance, pound/square inch by ASTM D-2794.
(14) Indirect Impact Resistance, pounds/square inch by ASTM D-2794.
(15, 16) Measured using trigloss meter supplied by BYK-Gardner.
(17) Dry film thickness, in mils, measured using Elcometer 345 using ASTM D-1400.
(18) QUV Resistance, accelerated weathering, ASTM G-53, 4 hours light at 60 ° C., 4 hours dark at 50 ° C., QUV B-313 bulbs.

EXAMPLE #8

Coatings Example #2

Coating compositions were prepared by mixing the following ingredients:

| Formulation | #1 | #2 |
| --- | --- | --- |
| Polyol from Example #1 | 10.8 | 0.0 |
| Polyol from Example #2 | 0.0 | 11.1 |
| Acrylic polyol (1) | 33.7 | 34.6 |
| Polymeric Isocyanate (2) | 22.3 | 23.1 |
| Solvent Blend (3) | 32.8 | 30.7 |
| Tin Catalyst (4) | 0.1 | 0.2 |
| Flow Control Agent (5) | 0.3 | 0.3 |

(1) SCX-902 ™ as supplied from S. C. Johnson Polymer
(2) Desmodur N3300 as supplied from Bayer Corporation
(3) Solvent blend 50 parts n-butyl acetate, 25 parts methyl n-amyl ketone, 25 parts methyl ethyl ketone.
(4) Dabco T-12 Catalyst from Air Products diluted to 2% by weight in n-butyl acetate
(5) BYK 310 as supplied from BYK-Chemie Properties of Formulations:

| Property | #1 | #2 |
| --- | --- | --- |
| VOC Theoretical (6) | 3.6 | 3.5 |
| Ratio Polyester/Acrylic Dry weight | 30/70 | 30/70 |
| Isocyanate/Hydroxyl Molar Equivalent Ratio | 1.1/1.0 | 1.1/1.0 |

(6) Volatile Organic Compounds in pounds of organic material/gallon of paint.

Measured Properties:

| Property | #1 | #2 |
| --- | --- | --- |
| VOC Measured (Pounds/Gallon) (7) | 3.2 | 3.1 |
| Viscosity (8) | 27 | 29 |

(7) Volatile Organic Compounds measured by ASTM D2369 pounds/gallon
(8) Viscosity via Zahn #2 efflux cup ASTM D-4312 measured in seconds Coatings were spray applied using convention spray guns over iron phosphate coated steel panels (9) and aluminum (10) to a dry film thickness of 1.5–3.0 mils. Coatings were flashed at ambient conditions for 30 minutes and baked at 105° C. for 30 minutes. Properties are listed below.

| Property | #1 | #2 |
| --- | --- | --- |
| Pendulum Hardness (11), 24 Hours | 49 | 9 |
| Pendulum Hardness, 1 Week | 103 | 39 |
| Pencil Hardness (12), 24 Hours | HB | 4B |
| Pencil Hardness, 2 Weeks | 2H | HB |
| Direct Impact Resistance(13), 4 Weeks | >160 | >160 |
| Indirect Impact Resistance (14) 4 weeks | >160 | >160 |
| Gloss, 20 Degree (15), 1 Week | 90 | 89 |
| Gloss, 60 Degree (16), 1 Week | 94 | 93 |
| Dry Film Thickness (17), 24 Hours | 2.5 | 2.5 |
| QUV Resistance (18): 20 Degree Gloss Retention at 2079 Total Hours | 91% | 80% |

(9) Bonderite 1000 panels supplied by ACT Laboratories
(10) Aluminum, untreated panels supplied by ACT Laboratories
(11) Pendulum Hardness, number of swings, ASTM D-4366.
(12) Pencil Hardness, grade of pencil lead, ASTM D3363.
(13) Direct Impact Resistance, pound/square inch by ASTM D-2794.
(14) Indirect Impact Resistance, pounds/square inch by ASTM D-2794.
(15, 16) Measured using trigloss meter supplied by BYK-Gardner.
(17) Dry film thickness, in mils, measured using Elcometer 345 using ASTM D-1400.
(18) QUV Resistance, accelerated weathering, ASTM G-53, 4 hours light at 60 ° C., 4 hours dark at 50 ° C., QUV B-313 bulbs.

EXAMPLE #9

Coatings Example #3

Coating compositions are prepared by mixing the following ingredients:

| Formulation | #1 | #2 | #3 |
| --- | --- | --- | --- |
| Polyol from Example #1 | 10.8 | 0.0 | 0.0 |
| Polyol from Example #3 | 0.0 | 0.0 | 10.7 |
| Commercial Polyester Polyol (1) | 0.0 | 11.4 | 0.0 |
| Acrylic polyol (2) | 33.6 | 35.4 | 33.3 |
| Polymeric Isocyanate (3) | 22.2 | 21.8 | 22.4 |
| Solvent Blend (4) | 32.6 | 30.6 | 32.7 |
| Tin Catalyst (5) | 0.6 | 0.6 | 0.6 |
| Flow Control Agent (6) | 0.2 | 0.2 | 0.3 |

(1) K-Flex 188 as supplied from King Industries
(2) SCX 902 as supplied from S. C. Johnson Polymer
(3) Desmodur N3300 as supplied from Bayer Corporation
(4) Solvent blend 50 parts n-butyl acetate, 25 parts methyl n-amyl ketone, 25 parts methyl ethyl ketone.
(5) Dabco T-12 Catalyst from Air Products diluted to 2% by weight in n-butyl acetate
(6) BYK 310 as supplied from BYK-Chemie

Properties of Formulations:

| Property | #1 | #2 | #3 |
| --- | --- | --- | --- |
| VOC Theoretical (7) | 3.5 | 3.6 | 3.5 |
| Ratio Polyester/Acrylic Dry weight | 30/70 | 30/70 | 30/70 |
| Isocyanate/Hydroxyl Molar Equivalent Ratio | 1.1/1.0 | 1.1/1.0 | 1.1/1.0 |

(7) Volatile Organic Compounds in pounds of organic material/gallon of paint.

Measured Properties

| Property | #1 | #2 | #3 |
| --- | --- | --- | --- |
| VOC Measured (Pounds/Gallon) (8) | 3.2 | 3.2 | 3.1 |
| Viscosity (9) | 28 | 29 | 27 |
| Visual Appearance | Clear | Clear | Hazy |

(8) Volatile Organic Compounds measured by ASTM D2369 pounds/gallon
(9) Viscosity via Zahn #2 efflux cup ASTM D-4312 measured in seconds Coatings were spray applied using convention spray guns over iron phosphate coated steel panels (10) and aluminum (11) to dry film thickness of 1.5–3.0 mils. Coatings were dried under ambient conditions.

Coatings properties are listed below:

| Property | #1 | #2 | #3 |
| --- | --- | --- | --- |
| Pendulum Hardness (12), 24 Hours | 22 | 17 | 22 |
| Pendulum Hardness, 1 Week | 91 | 77 | 88 |
| Pencil Hardness (13), 24 Hours | HB | HB | HB |
| Pencil Hardness, 2 Weeks | 1H | F | F |
| Direct Impact Resistance(14), 4 Weeks | >160 | >160 | >160 |
| Indirect Impact Resistance (15) 4 weeks | >160 | >160 | >160 |
| Gloss, 20 Degree (16), 1 Week | 91 | 91 | 87 |
| Gloss, 60 Degree (17), 1 Week | 96 | 96 | 96 |
| Dry Film Thickness (18), 24 Hours | 2.0 | 2.1 | 2.4 |

(10) Bonderite1000 panels supplied by ACT Laboratories
(11) Aluminum, untreated panels supplied by ACT Laboratories
(12) Pendulum Hardness, number of swings, ASTM D-4366.
(13) Pencil Hardness, grade of pencil lead, ASTM D3363.
(14) Direct Impact Resistance, pound/square inch by ASTM D-2794.
(15) Indirect Impact Resistance, pounds/square inch by ASTM D-2794.
(16, 17) Measured using trigloss meter supplied by BYK-Gardner.
(18) Dry film thickness, in mils, measured using Elcometer 345 using ASTM D-1400.

EXAMPLE #10

Coatings Example #4

Coating compositions are prepared by mixing the following ingredients:

| Formulation | #1 | #2 | #3 |
| --- | --- | --- | --- |
| Polyol from Example #1 | 10.9 | 0.0 | 0.0 |
| Polyol from Example #4 | 0.0 | 0.0 | 10.7 |
| Acrylic polyol (1) | 33.8 | 48.4 | 33.4 |
| Polymeric Isocyanate (2) | 22.3 | 15.6 | 22.5 |
| Solvent Blend (3) | 32.5 | 35.5 | 32.8 |
| Tin Catalyst (4) | 0.3 | 0.3 | 0.3 |
| Flow Control Agent (5) | 0.2 | 0.2 | 0.3 |

(1) SCX-902 as supplied from S. C. Johnson Polymer
(2) Desmodur N3300 as supplied from Bayer Corporation
(3) Solvent blend 50 parts n-butyl acetate, 25 parts methyl n-amyl ketone, 25 parts methyl ethyl ketone.
(4) Dabco T-12 Catalyst from Air Products diluted to 2% in n-butyl acetate
(5) BYK 310 as supplied from BYK-Chemie

Properties of Formulations:

| Property | #1 | #2 | #3 |
| --- | --- | --- | --- |
| VOC Theoretical (6) | 3.7 | 4.1 | 3.6 |
| Ratio Polyester/Acrylic Dry weight | 30/70 | 0/100 | 30/70 |
| Isocyanate/Hydroxyl Molar Equivalent Ratio | 1.1/1.0 | 1.1/1.0 | 1.1/1.0 |

(6) Volatile Organic Compounds in pounds of organic material/gallon of paint.

Measured Properties:

| Property | #1 | #2 | #3 |
| --- | --- | --- | --- |
| VOC Measured (Pounds/Gallon) (7) | 3.3 | 3.8 | 3.1 |
| Viscosity (8) | 29 | 29 | 29 |
| Visual Appearance | Clear | Clear | Clear |

(7) Volatile Organic Compounds measured by ASTM D2369 pounds/gallon
(8) Viscosity via Zahn #2 efflux cup ASTM D-4312 measured in seconds.

Coatings were spray applied using convention spray guns over iron phosphate coated steel panels (9) and aluminum (10) to dry film thickness of 1.5–3.0 mils. Coatings were flashed at ambient conditions for 30 minutes and baked at 105° C. for 30 minutes.

Coatings properties are listed below:

| Property | #1 | #2 | #3 |
| --- | --- | --- | --- |
| Pendulum Hardness (11), 24 Hours | 85 | 83 | 78 |
| Pendulum Hardness, 1 Week | 125 | 118 | 121 |
| Pencil Hardness (12), 24 Hours | 1H | F | F |
| Pencil Hardness, 1 Week | 2H | F | F |
| Direct Impact Resistance(13), 4 weeks | >160 | 130 | >160 |
| Indirect Impact Resistance (14) 4 weeks | >160 | 70 | >160 |
| Gloss, 20 Degree (15), 1 Week | 94 | 95 | 95 |
| Gloss, 60 Degree (16), 1 Week | 98 | 99 | 99 |
| Dry Film Thickness (17), 24 Hours | 1.8 | 1.5 | 1.8 |

(9) Bonderite1000 panels supplied by ACT Laboratories
(10) Aluminum, untreated panels supplied by ACT Laboratories
(11) Pendulum Hardness, number of swings, ASTM D-4366.
(12) Pencil Hardness, grade of pencil lead, ASTM D-3363.
(13) Direct Impact Resistance, pound/square inch by ASTM D-2794.
(14) Indirect Impact Resistance, pounds/square inch by ASTM D-2794.
(15, 16) Measured using trigloss meter supplied by BYK-Gardner.
(17) Dry film thickness, in mils, measured using Elcometer 345 using ASTM D-1400.

EXAMPLE #11

Coatings Example #5

Coating compositions were prepared by mixing the materials listed in the table below, then heating a sealed glass container containing the mixture in an oven at 105° C. for 2 hours, periodically shaking the container to insure that the components were mixed thoroughly.

| Formulation | #1 | #2 |
|---|---|---|
| Polyol from Example #1 | 24.32 | 0.0 |
| Polyol from Example #3 | 0.0 | 24.32 |
| Acrylic polyol (1) | 75.68 | 75.68 |

(1) SCX 902 as supplied from S. C. Johnson Polymer 75% in n-butyl acetate.

Properties of formulations Immediately after Mixing:

| Property | #1 | #2 |
|---|---|---|
| % Solids | 81.08 | 81.08 |
| Ratio Polyester/Acrylic Dry weight | 30/70 | 30/70 |
| Visual Appearance | Clear | Clear |

Properties of Formulations after 7 Days:

| Property | #1 | #2 |
|---|---|---|
| Visual Appearance | Clear | Cloudy, Crystalline precipitate |

EXAMPLE 12

Coatings Example #6

Coating compositions are prepared by mixing the following ingredients:

| Formulation | #1 | #2 | #3 | #4 |
|---|---|---|---|---|
| Polyol from Example #6 | 9.6 | 0.0 | 11.8 | 0 |
| Acrylic polyol (1) | 37.3 | 49.1 | | |
| Acrylic polyol (2) | | | 56.0 | 82.6 |
| Polymeric Isocyanate (3) | 17.9 | 10.5 | 22.8 | 15.6 |
| Solvent Blend (4) | 34.6 | 39.9 | 8.9 | 1.4 |
| Tin Catalyst (5) | 0.2 | 0.2 | 0.3 | 0.3 |
| Flow Control Agent (6) | 0.2 | 0.2 | 0.2 | 0.2 |

(1) Paraloid ® AU-608B as supplied by Rohm and Haas
(2) A solution of Reactol ™ 100 n-butyl-acetate was made. 49.2 parts of Reactol ™ 100 as supplied by Eastman Chemical was mixed with 50.8 parts n-butyl acetate
(3) Desmodur N3300 as supplied from Bayer Corporation
(4) Solvent blend 50 parts n-butyl acetate, 25 parts methyl n-amyl ketone, 25 parts methyl ethyl ketone.
(5) Dabco T-12 Catalyst from Air Products diluted to 2% by weight in n-butyl acetate
(6) BYK 310 as supplied from BYK-Chemie Properties of Formulations:

| Property | #1 | #2 | #3 | #4 |
|---|---|---|---|---|
| VOC Theoretical (&) | 4.1 | 4.8 | 3.2 | 3.6 |
| Ratio Polyester/Acrylic Dry weight | 30/70 | 0/100 | 30/70 | 0/100 |
| Isocyanate/Hydroxyl Molar Equivalent Ratio | 1.1/1.0 | 1.1/1.0 | 1.1/1.0 | 1.1/1.0 |

(7) Volatile Organic Compounds in pounds of organic material/gallon of paint

Measured Properties:

| Property | #1 | #2 | #3 | #4 |
|---|---|---|---|---|
| VOC Measured (Pounds/Gallon((8) | 4.0 | 4.7 | 3.2 | 3.7 |
| Viscosity (9) | 27 | 25 | 30 | 30 |
| Visual Appearance | Clear | Clear | Clear | Clear |

(8) Volatile Organic Compounds measured by ASTM D2369 pounds/gallon
(9) Viscosity via Zahn #2 efflux cup ASTM D-4312 measured in seconds.

Coatings were spray applied using conventional spray guns over iron phosphate coated steel panels (10) and aluminum (11) to dry film thickness of 1.5–2.5 mils. Coatings were flashed at ambient conditions for 30 minutes and baked at 105° C. for 30 minutes.

Coatings properties are listed below over steel panels.

| Property | #1 | #2 | #3 | #4 |
|---|---|---|---|---|
| Pendulum Hardness (12), 24 hours | 100 | 112 | 111 | 129 |
| Pendulum Hardness, 4 weeks | 125 | 128 | 134 | 139 |
| Pencil Hardness (13), 24 hours | 1H | F | F | 1H |
| Direct Impact Resistance (14), 4 weeks | >160 | 50 | >160 | 30 |
| Indirect Impact Resistance (15), 4 weeks | >160 | <<20 | >160 | <<20 |
| Gloss, 20 degree (16), 1 week | 95 | 92 | 100 | 107 |
| Gloss, 60 Degree (17), 1 Week | 98 | 97 | 103 | 107 |
| Dry Film Thickness (18), 24 hours | 2.0 | 1.9 | 1.8 | 2.0 |

(10) Bonderite 1000 panels supplied by ACT Laboratories
(11) Aluminum untreated panels supplied by ACT Laboratories
(12) Pendulum Hardness, number of swings, ASTM D-4366.
(13) Pencil Hardness, grade of pencil lead, ASTM D3363.
(14) Direct Impact Resistance, pound/square inch by ASTM D-2794.
(15) Indirect Impact Resistance, pounds/square inch by ASTM D-2794.
(16, 17) Measured using trigloss meter supplied by BYK-Gardner.
(18) Dry film thickness, in mils, measured using Elcometer 345 using ASTM D-1400.

EXAMPLE 13

Coatings Example #7

| Formulation | #1 | #2 |
|---|---|---|
| Polyol from Example #6 | 10.5 | 0.0 |
| Acrylic polyol (1) | 46.0 | 61.8 |
| Polymeric Isocyanate (2) | 8.7 | 5.4 |
| Solvent Blend (3) | 34.3 | 32.3 |

-continued

| Formulation | #1 | #2 |
|---|---|---|
| Tin Catalyst (4) | 0.2 | 0.2 |
| Flow Control Agent (5) | 0.2 | 0.3 |

(1) A solution of SCX804 in n-butyl acetate was made by mixing 53.4 parts of SCX804 as supplied by Johnson Polymer with 46.6 parts n-butyl acetate.
(2) Desmodur N3300 as supplied from Bayer Corporation.
(3) Solvent blend 50 parts n-butyl acetate, 25 parts methyl n-amyl ketone, 25 parts methyl ethyl ketone.
(4) Dabco T-12 Catalyst from Air Products diluted to 2% in n-butyl acetate.
(5) BYK 310 as supplied from BYK-Chemie Properties of Formulations:

| Property | #1 | #2 |
|---|---|---|
| VOC Theoretical (6) | 4.5 | 4.9 |
| Ratio Polyester/Acrylic Dry Weight | 30/70 | 0/100 |
| Isocyanate/Hydroxyl Molar Equivalent Ratio | 1.1/1.0 | 1.1/1.0 |

(6) Volatile Organic Compounds in pounds of organic material/gallon of paint

Measured Properties:

| Property | #1 | #2 |
|---|---|---|
| VOC Measured (Pounds/(Gallon((7) | 4.6 | 4.9 |
| Viscosity (8) | 27 | 28 |
| Visual Appearance | Clear | Clear |

(7) Volatile Organic Compounds measured by ASTM D2369 pounds/gallon
(8) Viscosity via Zahn #2 efflux cup ASTM D-4312 measured in seconds.

Coatings were spray applied using convention spray guns over iron phosphate coated steel panels (9) and aluminum (10) to dry film thickness of 1.5–2.5 mils. Coatings were flashed at ambient conditions for 30 minutes and baked at 105° C. for 30 minutes.

Coatings properties are listed below over steel panels:

| Property | #1 | #2 |
|---|---|---|
| Pendulm Hardness (11), 24 Hours | 118 | 114 |
| Pendulum Hardness, 4 weeks | 130 | 119 |
| Pencil Hardness (12), 24 Hours | F | F |
| Pencil Hardness, 1 Week | 1H | 1H |
| Direct Impact Resistance (13), 4 weeks | 100 | 30 |
| Indirect Impact Resistance (14) 4 weeks | 50 | <<20 |
| Gloss, 20 Degree (15), 1 week | 93 | 91 |
| Gloss, 60 Degree (16), 1 Week | 98 | 96 |
| Dry Film Thickness (17), 24 Hours | 2.0 | 2.2 |

(9) Bonderite 1000 panels supplied by ACT Laboratories.
(10) Aluminum, untreated panels supplied by ACT Laboratories.
(11) Pendulum Hardness, number of swings, ASTM D-4366.
(12) Pencil Hardness, grade of pencil lead, ASTMD-3363.
(13) Direct Impact Resistance, pounds/square inch by ASTM D-2794.
(14) Indirect Impact Resistance, pounds/square inch by ASTM D-2794.
(15,16) Measured using Tri-gloss meter supplied by BYK-Gardner.
(17) Dry film thickness, in mils, measured using Elcometer 345 using ASTM D-1400.

It should be understood that the present disclosure has been made only by way of preferred embodiments and that numerous changes in the details of construction, combination and arrangement of parts can be resorted to without departure from the spirit and scope of the invention.

What is claimed is:

1. A polymer composition comprising a blend or admixture of:
    a) at least one non-linear, branched polyester-based polyol resin which has an average functionality of greater than 2, a number average molecular weight of at least 500, and a hydroxyl value of between about 35 and about 350;
    b) at least one acrylic polyol resin blended with the polyester-based polyol resin and;
    c) at least one curing agent selected from the group consisting of an aliphatic amino resin, an aliphatic epoxy resin, an aromatic epoxy resin, a cycloaliphatic epoxy resin, an aliphatic di-isocyanate, an aliphatic triisocyanate, an aliphatic triisocyanurate, an aliphatic polyisocyanate, an aliphatic isocyanurate, an aliphatic allophanate, an aliphatic uretdione, an aliphatic biuret, an aliphatic isocyanate prepolymer, a cycloaliphatic di-isocyanate, a cycloaliphatic triisocyanate, a cycloaliphatic triisocyanurate, a cycloaliphatic polyisocyanate, a cycloaliphatic isocyanurate, a cycloaliphatic allophanate, a cycloaliphatic uretdione, a cycloaliphatic biuret, a cycloaliphatic isocyanate prepolymer, an aromatic di-isocyanate, an aromatic triisocyanate, an aromatic triisocyanurate, an aromatic polyisocyanate, an aromatic isocyanurate, an aromatic allophanate, an aromatic uretdione, an aromatic biuret, and an aromatic isocyanate prepolymer, in an amount substantially equivalent to the molar equivalent quantity of a) plus b);
    d) at least one catalyst; and
    e) at least one liquid carrier; wherein the non-linear polyester-based polyol is made by the process of reacting reactants consisting of (a) at least one branched, polyhydric alcohol having at least three hydroxyl groups, at least one of said hydroxyl groups being covalently bonded to a branched carbon atom; and (b) at least one glycol or diol selected from the group consisting of 1,4 butanediol, diethylene glycol, 2-methyl-1,3-propanediol, 2,2-dimethyl-1,3-propanediol, 1,4-cyclohexanedimethanol, 2-butyl-2-ethyl-1,3-propanediol, 2,2,4-trimethyl-1,3-pentanediol, 1,6-hexanediol, propylene glycol, 1,2 hexanediol, 1,3-butanediol, 1,5-pentanediol, and mixtures thereof; with (c) at least one compound selected from the group consisting of an aliphatic or aromatic dicarboxylic acid, compound selected from the group consisting of an aliphatic or aromatic dicarboxylic acid, a $C_1$–$C_6$ alkyl diester of an aliphatic or aromatic dicarboxylic acid, an aliphatic anhydride, and an aliphatic or aromatic diacid halide in a mole ratio of (a):(b):(c) from about 1:2:2 to about 1:205:150, at a temperature sufficient to achieve esterification or transesterification.

2. The composition in accordance with claim 1, wherein the branched polyhydric alcohol is reacted with an aliphatic or aromatic diester, and wherein the mole ratio of the branched polyhydric alcohol (a) and diol (b) to the diester (c) is between about 1:6:3 and about 1:120:8.

3. The composition in accordance with claim 1, wherein the branched, polyhydric alcohol having at least three hydroxyl groups is selected from the group consisting of trimethylolpropane, trimethylolethane, pentaerythritol, glycerine, dipentaerythritol, and mixtures thereof.

4. A polymer composition comprising a blend or admixture of:
   a) at least one non-linear, branched polyester-based polyol resin which has an average functionality of greater than 2, a number average molecular weight of at least 500, and a hydroxyl value of between about 35 and about 350;
   b) at least one acrylic polyol resin blended with the polyester-based polyol resin and;
   c) at least one curing agent selected from the group consisting of an aliphatic amino resin, an aliphatic epoxy resin, an aromatic epoxy resin, a cycloaliphatic epoxy resin, an aliphatic di-isocyanate, an aliphatic triisocyanate, an aliphatic triisocyanurate, an aliphatic polyisocyanate, an aliphatic isocyanurate, an aliphatic allophanate, an aliphatic uretdione, an aliphatic biuret, an aliphatic isocyanate prepolymer, a cycloaliphatic di-isocyanate, a cycloaliphatic triisocyanate, a cycloaliphatic triisocyanurate, a cycloaliphatic polyisocyanate, a cycloaliphatic isocyanurate, a cycloaliphatic allophanate, a cycloaliphatic uretdione, a cycloaliphatic biuret, a cycloaliphatic isocyanate prepolymer, an aromatic di-isocyanate, an aromatic triisocyanate, an aromatic triisocyanurate, an aromatic polyisocyanate, an aromatic isocyanurate, an aromatic allophanate, an aromatic uretdione, an aromatic biuret, and an aromatic isocyanate prepolymer, in an amount substantially equivalent to the molar equivalent quantity of a) plus b);
   d) at least one catalyst; and
   e) at least one liquid carrier; wherein the non-linear polyester-based polyol is made by the process of reacting reactants consisting essentially of (a) at least one branched, polyhydric alcohol having at least three hydroxyl groups, at least one of said hydroxyl groups being covalently bonded to a branched carbon atom; and (b) at least one glycol or diol; with (c) a $C_1$–$C_6$ alkyl diester of an aliphatic or aromatic dicarboxylic acid, and wherein said diester is selected from the group consisting of dimethyl 1,12-dodecanedioate, dimethyl tartrate, dimethyl sebacate, dimethyl azelate, dimethyl suberate, dimethyl pimelate, dimethyl adipate, dimethyl glutarate, dimethyl succinate, and mixtures thereof in a mole ratio of (a):(b):(c) from about 1:2:2 to about 1:205:150, at a temperature sufficient to achieve esterification or transesterification.

5. The composition in accordance with claim 4 wherein said diester is selected from the group consisting of dimethyl adipate, dimethyl glutarate, and mixtures thereof.

6. The composition in accordance with claim 5, wherein the mole ratio of dimethyl adipate to dimethyl glutarate is about 1:3.

7. The composition in accordance with claim 1, wherein said glycol or diol is 1,4-cyclohexane dimethanol, 2-methyl-1,3-propanediol, or a mixture thereof.

8. The composition in accordance with claim 1, wherein the polyester polyol is a polyester of dimethyl adipate, dimethyl glutarate, trimethylolpropane, and cyclohexanedimethanol.

9. The composition in accordance with claim 1, wherein said one nonlinear, branched polyester-based polyol resin has an average functionality of less than 6.

10. The composition in accordance with claim 1, wherein said one nonlinear, branched polyester-based polyol resin has an average functionality of between 2.1 to 2.5.

11. The composition in accordance with claim 1, wherein the number average molecular weight of said polyester based polyol resin is between about 500 and 1500.

12. The composition in accordance with claim 1 wherein one of the curing agents comprises an aliphatic isocyanate based on hexamethylene diisocyanate.

13. The composition in accordance with claim 1, wherein the isocyanate is added to the said polyol resins in a molar equivalent ratio of about 0.5:1 to 3:1.

14. The composition in accordance with claim 1, wherein the isocyanate is added to the said polyol resins in a molar equivalent ratio of about 0.8:1 to 1.4:1.

15. The composition in accordance with claim 1, wherein said catalyst is employed in an amount between about 0.0001% and about 5%, based upon the weight of the composition.

16. The composition in accordance with claim 1, wherein said liquid carrier is selected from the group consisting of a ketone solvent selected from the group consisting of acetone, methyl ethyl ketone, methyl isobutyl ketone, methyl butyl ketone, methyl amyl ketone; an ester solvent selected from the group consisting of methyl acetate, ethyl acetate, propyl acetate, butyl acetate, t-butyl acetate, isobutyl acetate, ethylethoxy propionate, ethylethoxy acetate, ethylene glycol monomethyl ether acetate, ethylene glycol monoethyl ether acetate; an aromatic solvent selected from the group consisting of xylene, toluene, aromatic naphtha, aromatic 100, aromatic 150, aromatic 200, parachlorobenzotrifluoride, an aromatic hydrocarbon mixture having a boiling point of 152° C.–174° C.; mineral spirits; and combinations thereof.

17. The composition in accordance with claim 1, wherein the polyester-based polyol resin is included in the composition in an amount of about 5% to about 95% based on the total weight of the composition.

18. The composition in accordance with claim 1, wherein the polyester-based polyol resin is included in the composition in an amount of about 10% to about 70% based on the total weight of the composition.

19. The composition in accordance with claim 1, wherein the polyester-based polyol resin is included in the composition in an amount of about 20% to about 40% based on the total weight of the composition.

20. The composition in accordance with claim 1 further including at least one surface tension reducing additive/flow aid in an amount of about 0.001% to about 10% by weight, based on the total weight of the composition.

21. The composition in accordance with claim 1 further including at least one pigment.

22. The composition in accordance with claim 1 cured at ambient temperature.

23. The composition in accordance with claim 1 baked to cure at a temperature from about 50° C. to about 200° C.

24. A method of increasing the hardness and flexibility of a polymeric coating utilizing a coating composition by blending:
   a) at least one nonlinear, branched polyester-based polyol resin which has an average functionality of greater than 2, a number average molecular weight of at least 500, and a hydroxyl value of between about 35 and about 350 wherein the polyester-based polyol is prepared by reacting reactants consisting of (a) at least one branched, polyhydric alcohol having at least three hydroxyl groups, at least one of said hydroxyl groups being covalently bonded to a branched carbon atom; and (b) rat least one glycol or diol; with (c) at least one compound selected from the group consisting of an aliphatic or aromatic dicarboxylic acid, a $C_1$–$C_6$ alkyl diester of an aliphatic or aromatic dicarboxylic acid, an aliphatic anhydride, and an aliphatic or aromatic diacid halide in a mole ratio of (a):(b):(c) from about 1:2:2 to about 1:205:150, at a temperature sufficient to achieve esterification or transesterification;

b) at least one acrylic polyol resin;

c) at least one curing agent for the polyol resins selected from the group consisting of an aliphatic amino resin, an aliphatic epoxy resin, an aromatic epoxy resin, a cycloaliphatic epoxy resin, an aliphatic di-isocyanate, an aliphatic triisocyanate, an aliphatic triisocyanurate, an aliphatic polyisocyanate, an aliphatic isocyanurate, an aliphatic allophanate, an aliphatic uretdione, an aliphatic biuret, an aliphatic isocyanate prepolymer, a cycloaliphatic di-isocyanate, a cycloaliphatic triisocyanate, a cycloaliphatic triisocyanurate, a cycloaliphatic polyisocyanate, a cycloaliphatic isocyanurate, a cycloaliphatic allophanate, a cycloaliphatic uretdione, a cycloaliphatic biuret, a cycloaliphatic isocyanate prepolymer, an aromatic di-isocyanate, an aromatic triisocyanate, an aromatic triisocyanurate, an aromatic polyisocyanate, an aromatic isocyanurate, an aromatic allophanate, an aromatic uretdione, an aromatic biuret, and an aromatic isocyanate prepolymer, in an amount substantially equivalent to the molar equivalent quantity of a) plus b);

d) at least one catalyst; and e) at least one liquid carrier;

wherein the non-linear polyester-based polyol is made by the process of reacting (a) at least one branched, polyhydric alcohol having at least three hydroxyl groups, at least one of said hydroxyl groups being covalently bonded to a branched carbon atom; and (b) at least one glycol or diol selected from the group consisting of 1,4 butanediol, diethylene glycol, 2-methyl-1,3-propanediol, 2,2-dimethyl-1,3-propanediol, 1,4-cyclohexanedimethanol, 2-butyl-2-ethyl-1,3-propanediol, 2,2,4-trimethyl-1,3-pentanediol, 1,6-hexanediol, propylene glycol, 1,2 hexanediol, 1,3-butanediol, 1,5-pentanediol, and mixtures thereof; with (c) at least one compound selected from the group consisting of an aliphatic or aromatic dicarboxylic acid, a $C_1$–$C_6$ alkyl diester of an aliphatic or aromatic dicarboxylic acid, an aliphatic anhydride, and an aliphatic or aromatic diacid halide in a mole ratio of (a):(b):(c) from about 1:2:2 to about 1:205:150, at a temperature sufficient to achieve esterification or transesterification.

25. A polymer composition comprising a blend or admixture of:

a) at least one non-linear, branched polyester-based polyol resin which has an average functionality of greater than 2, a number average molecular weight of at least 500, and a hydroxyl value of between about 35 and about 350 blended with;

b) at least one acrylic polyol resin; and c) at least one liquid carrier, wherein the polyester-based polyol resin is prepared by reacting, and then curing, reactants consisting of (a) at least one branched, polyhydric alcohol having at least three hydroxyl groups, at least one of said hydroxyl groups being covalently bonded to a branched carbon atom; and (b) at least one glycol or diol selected from the group consisting of 1,4 butanediol, diethylene glycol, 2-methyl-1,3-propanediol, 2,2-dimethyl-1,3-propanediol, 1,4-cyclohexanedimethanol, 2-butyl-2-ethyl-1,3-propanediol, 2,2,4-trimethyl-1,3-pentanediol, 1,6-hexanediol, propylene glycol, 1,2 hexanediol, 1,3-butanediol, 1,5-pentanediol, and mixtures thereof; with (c) at least one compound selected from the group consisting of an aliphatic or aromatic dicarboxylic acid, a $C_1$–$C_6$ alkyl diester of an aliphatic or aromatic dicarboxylic acid, an aliphatic anhydride, and an aliphatic or aromatic diacid halide in a mole ratio of (a):(b):(c) from about 1:2:2 to about 1:205:150, at a temperature sufficient to achieve esterification or transesterification.

26. The composition in accordance with claim 25, wherein the branched polyhydric alcohol is reacted with an aliphatic or aromatic diester, and wherein the mole ratio of the branched polyhydric alcohol (a) and diol (b) to the diester (c) is between about 1:6:3 and about 1:120:8.

27. The composition in accordance with claim 25, wherein the branched, polyhydric alcohol having at least three hydroxyl groups is selected from the group consisting of trimethylolpropane, trimethylolethane, pentaerythritol, dipentaerythritol, and mixtures thereof.

28. The composition in accordance with claim 25, wherein the branched polyhydric alcohol is reacted with a $C_1$–$C_6$ alkyl diester of an aliphatic or aromatic dicarboxylic acid, and wherein said diester is selected from the group consisting of dimethyl 1,12-dodecanedioate, dimethyl tartrate, dimethyl sebacate, dimethyl azelate, dimethyl suberate, dimethyl pimelate, dimethyl adipate, dimethyl glutarate, dimethyl succinate, and mixtures thereof.

29. The composition in accordance with claim 28, wherein said diester is selected from the group consisting of dimethyl adipate, dimethyl glutarate, and mixtures thereof.

30. The composition in accordance with claim 28, wherein the mole ratio of dimethyl adipate to dimethyl glutarate is about 1:3.

31. The composition in accordance with claim 29, wherein said glycol or diol is 1,4-cyclohexane dimethanol, 2-methyl-1,3-propanediol, or a mixture thereof.

32. The composition in accordance with claim 25, wherein the polyester-based polyol resin is a polyester of dimethyl adipate, dimethyl glutarate, trimethylolpropane, and cyclohexanedimethanol.

33. The composition in accordance with claim 25, wherein said one nonlinear, branched polyester-based polyol resin has an average functionality of less than 6.

34. The composition in accordance with claim 25, wherein said one nonlinear, branched polyester-based polyol resin has an average functionality of between 2.1 to 2.5.

35. The composition in accordance with claim 1, wherein the number average molecular weight of said polyester-based polyol resin is between about 500 and 1500.

36. The composition in accordance with claim 1, wherein the polyester-based polyol resin is included in the composition in an amount of about 5% to about 95% based on the total weight of the composition.

37. The composition in accordance with claim 25, wherein the polyester-based polyol resin is included in the composition in an amount of about 20% to about 40% based on the total weight of the composition.

38. A method of increasing the hardness and flexibility of a polymeric coating utilizing a coating composition by blending:

a) at least one nonlinear, branched polyester-based polyol resin which has an average functionality of greater than 2, a number average molecular weight of at least 500, and a hydroxyl value of between about 35 and about 350;

b) at least one acrylic polyol resin;

c) at least one curing agent for the polyol resins;

d) at least one catalyst; and
e) at least one liquid carrier;
wherein the non-linear polyester-based polyol (a) is made by the process of reacting reactants consisting of (1) at least one branched, polyhydric alcohol having at least three hydroxyl groups, at least one of said hydroxyl groups being covalently bonded to a branched carbon atom; and (2) at least one glycol or diol selected from the group consisting of 1,4 butanediol, diethylene glycol, 2-methyl-1,3-propanediol, 2,2-dimethyl-1,3-propanediol, 1,4-cyclohexanedimethanol, 2-butyl-2-ethyl-1,3-propanediol, 2,2,4-trimethyl-1,3-pentanediol, 1,6-hexanediol, propylene glycol, 1,2 hexanediol, 1,3-butanediol, 1,5-pentanediol, and mixtures thereof; with (c) at least one compound selected from the group consisting of an aliphatic or aromatic dicarboxylic acid, a $C_1$–$C_6$ alkyl diester of an aliphatic or aromatic dicarboxylic acid, an aliphatic anhydride, and an aliphatic or aromatic diacid halide in a mole ratio of (a):(b):(c) from about 1:2:2 to about 1:205:150, at a temperature sufficient to achieve esterification or transesterification.

39. A polymer composition comprising a blend or admixture of:
a) at least one non-linear, branched polyester-based polyol resin which has an average functionality of greater than 2, a number average molecular weight of at least 500, and a hydroxyl value of between about 35 and about 350, said polyester-based polyol resin being made by a process of reacting (a) at least one branched, polyhydric alcohol having at least three hydroxyl groups, at least one of said hydroxyl groups being covalently bonded to a branched carbon atom; and (b) at least one glycol or diol; with (c) a $C_1$–$C_6$ alkyl diester selected from the group consisting of dimethyl 1,12 -dodecanedioate, dimethyl tartrate, dimethyl sebacate, dimethyl azelate, dimethyl suberate, dimethyl pimelate, dimethyl adipate, dimethyl glutarate, dimethyl succinate, and mixtures thereof;
b) at least one acrylic polyol resin;
c) at least one curing agent for the curing resins, which is selected from the group consisting of an aliphatic amino resin, an aliphatic epoxy resin, an aromatic epoxy resin, a cycloaliphatic epoxy resin, an aliphatic di-isocyanate, an aliphatic triisocyanate, an aliphatic triisocyanurate, an aliphatic polyisocyanate, an aliphatic isocyanurate, an aliphatic allophanate, an aliphatic uretdione, an aliphatic biuret, an aliphatic isocyanate prepolymer, a cycloaliphatic di-isocyanate, a cycloaliphatic triisocyanate, a cycloaliphatic triisocyanurate, a cycloaliphatic polyisocyanate, a cycloaliphatic isocyanurate, a cycloaliphatic allophanate, a cycloaliphatic uretdione, a cycloaliphatic biuret, a cycloaliphatic isocyanate prepolymer, an aromatic di-isocyanate, an aromatic triisocyanate, an aromatic triisocyanurate, an aromatic polyisocyanate, an aromatic isocyanurate, an aromatic allophanate, an aromatic uretdione, an aromatic biuret, and an aromatic isocyanate prepolymer, in an amount substantially equivalent to the molar equivalent quantity of a) plus b);
d) at least one catalyst; and
e) at least one liquid carrier.

40. The composition in accordance with claim 39 wherein said diester is selected from the group consisting of dimethyl adipate, dimethyl glutarate, and mixtures thereof.

41. The composition in accordance with claim 40, wherein the mole ratio of dimethyl adipate to dimethyl glutarate is about 1:3.

42. The composition in accordance with claim 41, wherein said glycol or diol is selected from the group consisting of 1,4 butanediol, diethylene glycol, 2-methyl-1, 3-propanediol, 2,2-dimethyl-1,3-propanediol, 1,4-cyclohexanedimethanol, 2-butyl-2-ethyl-1,3-propanediol, 2,2,4-trimethyl-1,3-pentanediol, 1,6-hexanediol, propylene glycol, 1,2 hexanediol, 1,3-butanediol, 1,5-pentanediol, and mixtures thereof.

43. The composition of claim 39, wherein the mole ratio of (a):(b):(c) is in the range of about 1:2:2 to about 1:205: 150.

44. The composition of claim 39, wherein the branched, polyhdric alcohol having at least three hydroxyl groups is selected from the group consisting of trimethylolpropane, trimethylolethane, pentaerythritol, dipentaerythritol, and mixtures thereof.

* * * * *